US007315404B2

(12) United States Patent
Kimura

(10) Patent No.: US 7,315,404 B2
(45) Date of Patent: Jan. 1, 2008

(54) MONITORING JOB STATUS FOR GROUPED PRINT JOBS

(75) Inventor: Mitsuo Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 09/969,819

(22) Filed: Oct. 4, 2001

(65) Prior Publication Data

US 2002/0042797 A1    Apr. 11, 2002

(30) Foreign Application Priority Data

Oct. 6, 2000 (JP) .......................... 2000-307892
Sep. 27, 2001 (JP) .......................... 2001-297448

(51) Int. Cl.
- *H04N 1/32* (2006.01)
- *H04N 1/333* (2006.01)
- *G06F 3/14* (2006.01)
- *G06F 11/32* (2006.01)
- *G06F 3/12* (2006.01)

(52) U.S. Cl. ..................... 358/406; 358/1.15; 358/441; 358/1.13

(58) Field of Classification Search ............... 358/1.15, 358/1.2, 1.16, 1.9, 1.3, 1.14
See application file for complete search history.

(56) References Cited

U.S. PATENT DOCUMENTS

| 5,799,206 | A  | * | 8/1998  | Kitagawa et al. ............. 710/36 |
| 5,937,151 | A  | * | 8/1999  | Kadota ...................... 358/1.15 |
| 6,173,289 | B1 | * | 1/2001  | Sonderegger et al. ... 707/103 R |
| 6,213,652 | B1 | * | 4/2001  | Suzuki et al. .............. 358/1.15 |
| 6,396,594 | B1 | * | 5/2002  | French et al. .............. 358/1.18 |
| 6,474,881 | B1 | * | 11/2002 | Wanda ........................ 400/61 |
| 6,549,947 | B1 | * | 4/2003  | Suzuki ....................... 709/229 |
| 6,559,965 | B1 | * | 5/2003  | Simpson et al. ........... 358/1.15 |
| 6,583,886 | B1 | * | 6/2003  | Ochiai ....................... 358/1.15 |
| 6,734,985 | B1 | * | 5/2004  | Ochiai ....................... 358/1.15 |
| 6,809,831 | B1 | * | 10/2004 | Minari ....................... 358/1.15 |
| 6,980,305 | B2 | * | 12/2005 | Martinez .................... 358/1.1 |

(Continued)

FOREIGN PATENT DOCUMENTS

JP    11-119940    4/1999

(Continued)

OTHER PUBLICATIONS

U.S. Appl. No. 09/354,727, filed Jul. 16, 1999.

(Continued)

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

When a group print job is to be processed, a print application issues a grouping start instruction to a print system client first. The respective print jobs are then transmitted to a spooler. The print system client extracts the print jobs and sends them to a printer in accordance with scheduling by a print system server. In this case, if a transmission retry, transmission error, error after transmission, or the like occurs in a member print job belonging to the group job, the corresponding status is set as the status of the group job. The subsequent processing is performed as if the error had occurred in the overall group job.

18 Claims, 17 Drawing Sheets

U.S. PATENT DOCUMENTS

| | | | |
|---|---|---|---|
| 7,068,388 B2 * | 6/2006 | Kimura | 358/1.15 |
| 2002/0030840 A1 * | 3/2002 | Itaki et al. | 358/1.13 |
| 2002/0131069 A1 * | 9/2002 | Wanda | 358/1.14 |
| 2004/0012807 A1 * | 1/2004 | Konishi | 358/1.15 |
| 2004/0212821 A1 * | 10/2004 | Kimura | 358/1.14 |

FOREIGN PATENT DOCUMENTS

| | | | |
|---|---|---|---|
| JP | 11119940 A * | 4/1999 | |
| JP | 2001-256013 | 9/2001 | |
| JP | 2002182878 A * | 6/2002 | |
| JP | 2002182879 A * | 6/2002 | |
| JP | 2004326458 A * | 11/2004 | |

OTHER PUBLICATIONS

U.S. Appl. No. 09/969,797, filed Oct. 4, 2001.

* cited by examiner

FIG. 8

| JOB ID |
|---|
| DOCUMENT NAME |
| STATUS |
| PRIORITY LEVEL |

FIG. 16

| DOCUMENT NAME | STATUS | OWNER | NUMBER OF PAGES | SIZE | START TIME |
|---|---|---|---|---|---|
| ◆ GROUP JOB : PowerPoint-PRESENTATION | sent error | matsueda | 4390912 | 15.3KB | 21 : 44 06/29 |

PRINTER(P)  DISPLAY(V)  DOCUMENT(D)  VERSION(I)

ONE DOCUMENT IN QUEUE

FIG. 17

DETAILS OF GROUP JOB

GROUP LIST

- PowerPoint-PRESENTATION
- TEST PAGE
- NO TITLE-MEMO

DETAILED LIST(S)

| ITEM | VALUE |
|---|---|
| DOCUMENT NAME | PowerPint-PRESENTATION |
| STATUS | sent |
| NUMBER OF PAGES | 4390912 |
| SIZE | 15.3KB |
| START TIME | 21:44 06/29 |
| PORT | NC002@840 |

OK

MONITORING JOB STATUS FOR GROUPED PRINT JOBS

FIELD OF THE INVENTION

The present invention relates to a print system which receives a print instruction for a print job from the spooler of an operating system (OS), then spools the print job in the system again, and schedules the print job and, more particularly, to a method of causing a printer to execute print jobs for which a grouping instruction is generated in regular order in the group without allowing any interruption by another print job when a print system receives a print job grouping instruction from a print application.

BACKGROUND OF THE INVENTION

Recently, as personal computers (PCs) have become remarkably popularized in offices, networking techniques for connecting them have advanced. Conventionally, upon use, printers are connected to PCs in a one-to-one correspondence. As is often the case recently, a printer is connected to a network to allow PCs connected to the network to share the printer.

Under the circumstances, a print system exists, which receives print data written in the printer language created by a printer driver from the spooler of the OS of a PC, and a print job including this print data is spooled again, thereby providing a print job control function more advanced than the function provided by the OS. A known example of the print job control functions is the job grouping function of grouping a plurality of print job by numbering them, and transmitting the grouped jobs to the printer in the set order.

When a job grouping function is provided for such a print system, the print system performs sequence control on grouped print jobs by controlling the scheduling of the print jobs instead of actually merging the print data. Such a group of jobs looks like one job (to be referred to as a group job) to the user. This makes it possible to handle the grouped jobs together. Even if, however, the overall group is made to look like one job to the user, a plurality of jobs are continuously processed internally. As a consequence, such jobs undergo status transition different from that of general jobs.

SUMMARY OF THE INVENTION

The present invention has been made in consideration of the above prior art, and has as its object to provide a print control method and apparatus, a print system, and a storage medium, in which even when a plurality of jobs grouped are to be handled as one job, the respective jobs can be processed in the same manner as general jobs.

In order to achieve the above object, the present invention has the following arrangement.

There is provided a print control apparatus for executing a group job including a plurality of print jobs as member print jobs, characterized by comprising:

means for continuously executing the member print jobs included in the group job in a designated order; and means for, when a status of any member print job changes, changing a status of the group job, to which the member print job belongs, in accordance with the status of the member print job.

More preferably, when the status of the member print job changes to "sending" indicating that the job is being transmitted to a printer, said changing means changes the status of the group job to which the member print job belongs to "sending".

More preferably, when the status of the member print job changes to "sent" indicating that the job has been sent to a printer, said changing means changes the status of the group job to which the member print job belongs to "sent" if statuses of all member print jobs of the group job are "sent", and changes the status of the group job to "sent error" indicating the occurrence of an error after transmission to the printer if the status of any member print job is "sent error".

More preferably, when the status of the member print job changes to "interrupt" indicating that transmission can be resumed, said changing means changes the status of the group job to which the member print job belongs to "interrupt".

More preferably, when the status of the member print job changes to "stop" indicating that transmission cannot be resumed, said changing means changes the status of the group job to which the member print job belongs to "stop".

More preferably, when the status of the member print job changes to "sent error", said changing means changes the status of the group job to which the member print job belongs to "sent error" if statuses of all member print jobs of the group job are "sent" or "sent error".

More preferably, this apparatus further comprises display means for displaying a status of a print job under processing including the status of the group job.

More preferably, when the status of the member print job changes to "stop", processing of other member print jobs is stopped regardless of the statuses of the jobs.

Other features and advantages of the present invention will be apparent from the following description taken in conjunction with the accompanying drawings, in which like reference characters designate the same or similar parts throughout the FIGS. thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view for explaining print job information according to the embodiment of the present invention;

FIG. 16 is a view showing a job window of a print system/user interface; and

FIG. 17 is a view showing a detailed window of the print system/user interface.

DETAILED DESCRIPTION OF THE PREFERRED EMBODIMENT

An embodiment of the present invention will be described below with reference to the accompanying drawings.

Figure 1:
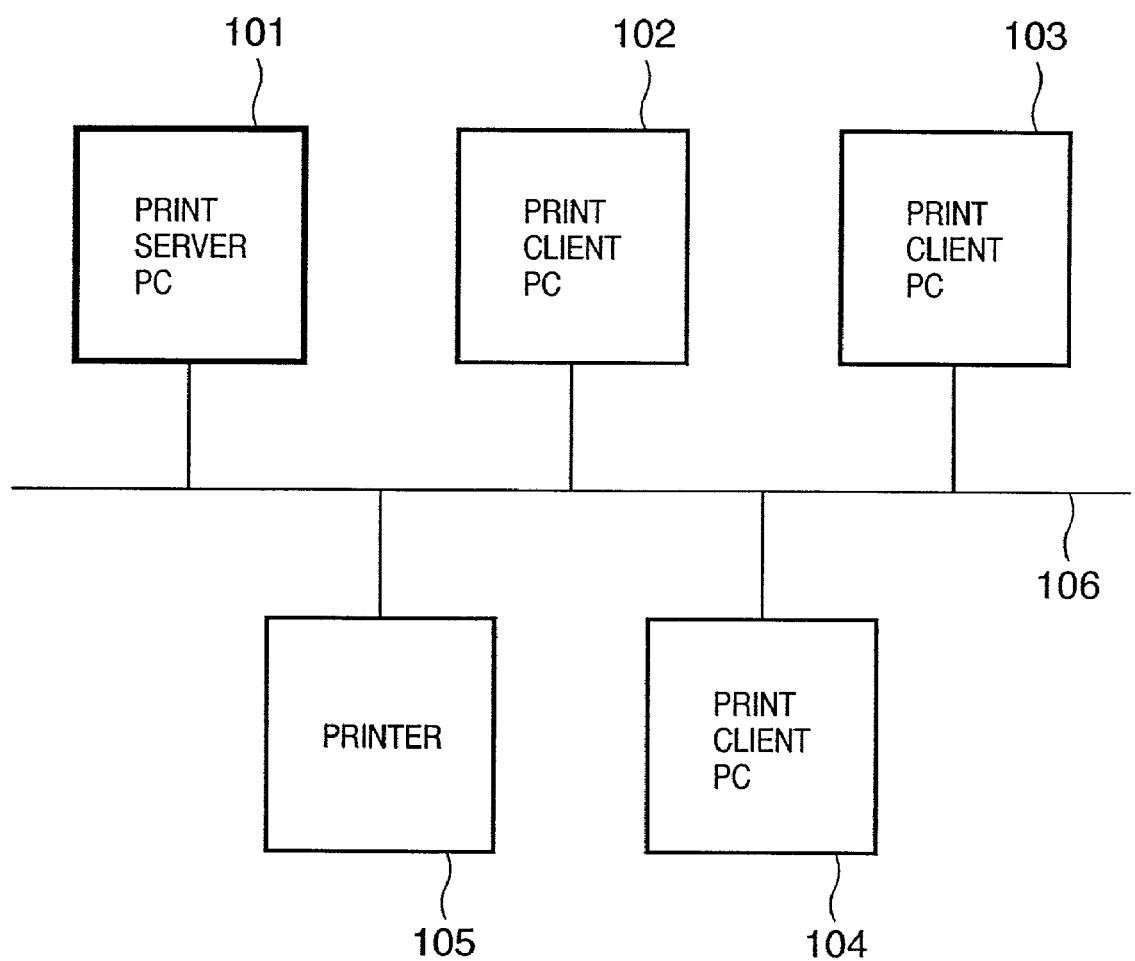
FIG. 1 is a block diagram showing the arrangement of a network system to which a print system according to an embodiment of the present invention is applied.

FIG. 1 is a block diagram showing the system configuration of a network system to which a print system according to an embodiment of the present invention is applied. In the network system according to this embodiment, a print server PC 101, print client PCs 102, 103, and 104, and a printer 105 are connected to a network 106. It is assumed that a total of n print clients and printers are connected to the network. For the sake of convenience, FIG. 1 shows only three print clients and one printer. Although the printer 105 in this embodiment is a network printer directly connected to the network 106, this printer may be a local printer connected to the print server PC 102.

The print server PC 101 is connected to the network 106 through a network cable. The print server PC 101 receives print data described in a printer language from the print client PCs 102, 103, and 104 and transmits the data to the printer 105.

The print client PCs 102, 103, and 104 are connected to the network 106 through a network cable, and transfer print data and print information to the print server PC 101.

The printer 105 is connected to the network 106 through a network interface. The printer 105 converts print data transmitted from the print server PC 101 into dot image page by page and prints them page by page. The network 106 is connected to the print server PC 101, print client PCs 102, 103, and 104, printer 105, and the like.

Figure 2:
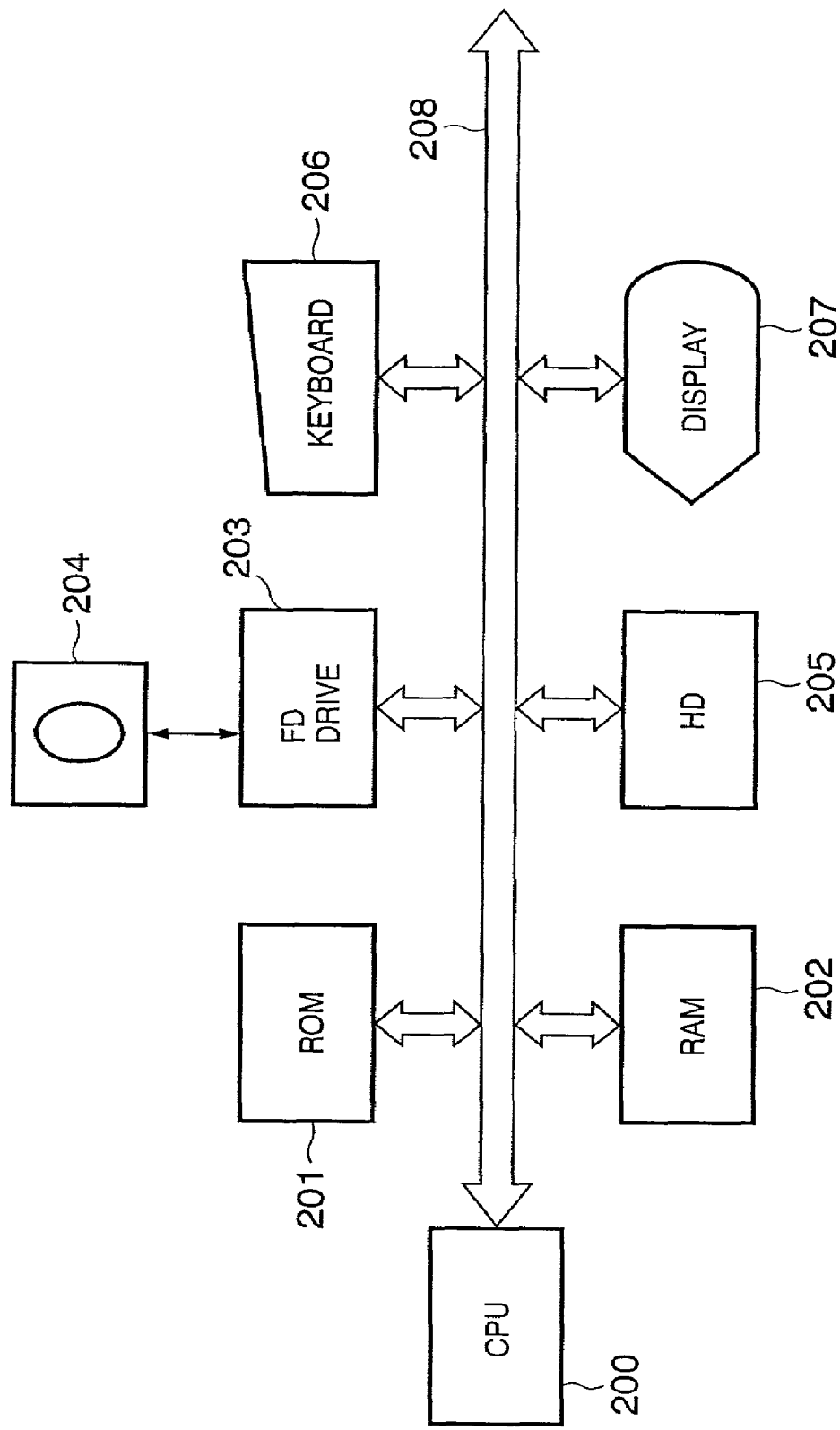
FIG. 2 is a block diagram showing the schematic arrangement of a server and client computers according to the embodiment of the present invention.

FIG. 2 is a block diagram showing the schematic arrangement of a computer for implementing the print server PC 101 and print client PCs 102, 103, and 104 according to the embodiment of the present invention. The computer includes a CPU 200, ROM 201, RAM 202, floppy disk (FD) drive 203, FD 204, hard disk (HD) 205, keyboard 206, display 207, and system bus 208.

Figure 3:
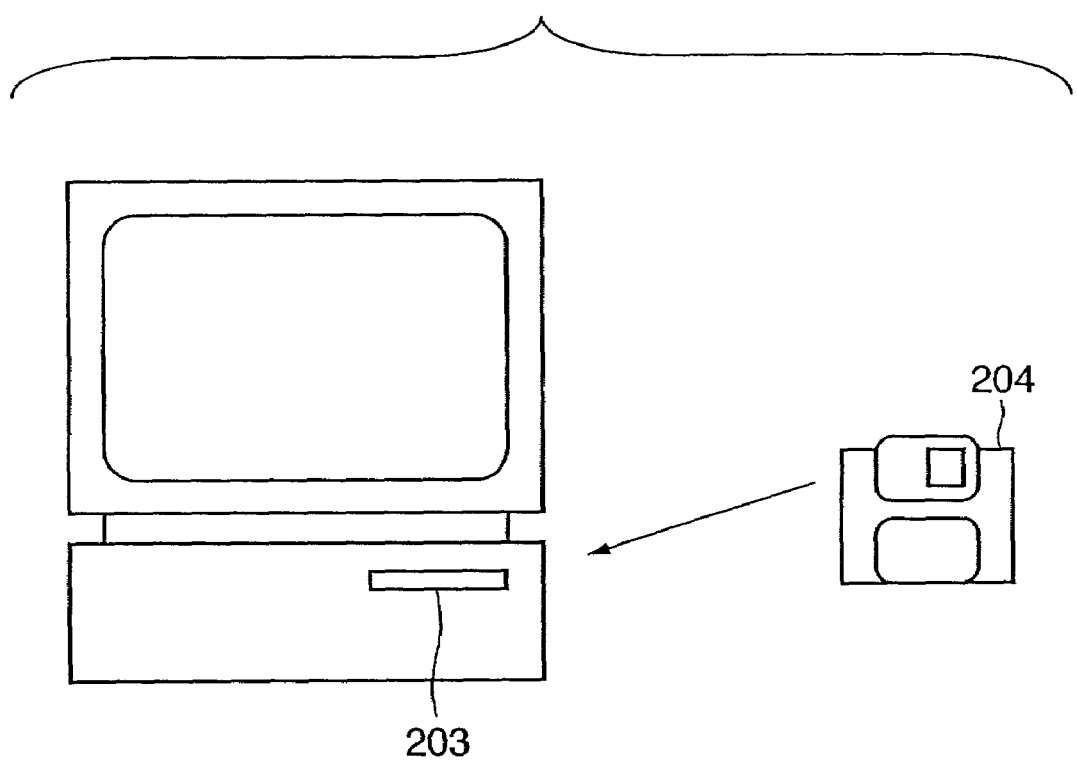
FIG. 3 is a view showing the concept of operation of supplying a program from an FD to the server or client computer according to the embodiment of the present invention.

The CPU 200 executes the operating system (OS), print server program, and the like stored in the HD 205, and performs control to temporarily store information necessary for the execution of a program in the RAM 202. A basic I/O program and the like are stored in the ROM 201. The RAM 202 serves as the main memory, work area, and the like of the CPU 200. As shown in FIG. 3, a print server program, a print system program including a print client program, or the like stored in the FD 204 can be loaded into the computer system through the FD drive 203 mounted in the computer or the like.

Figure 4:
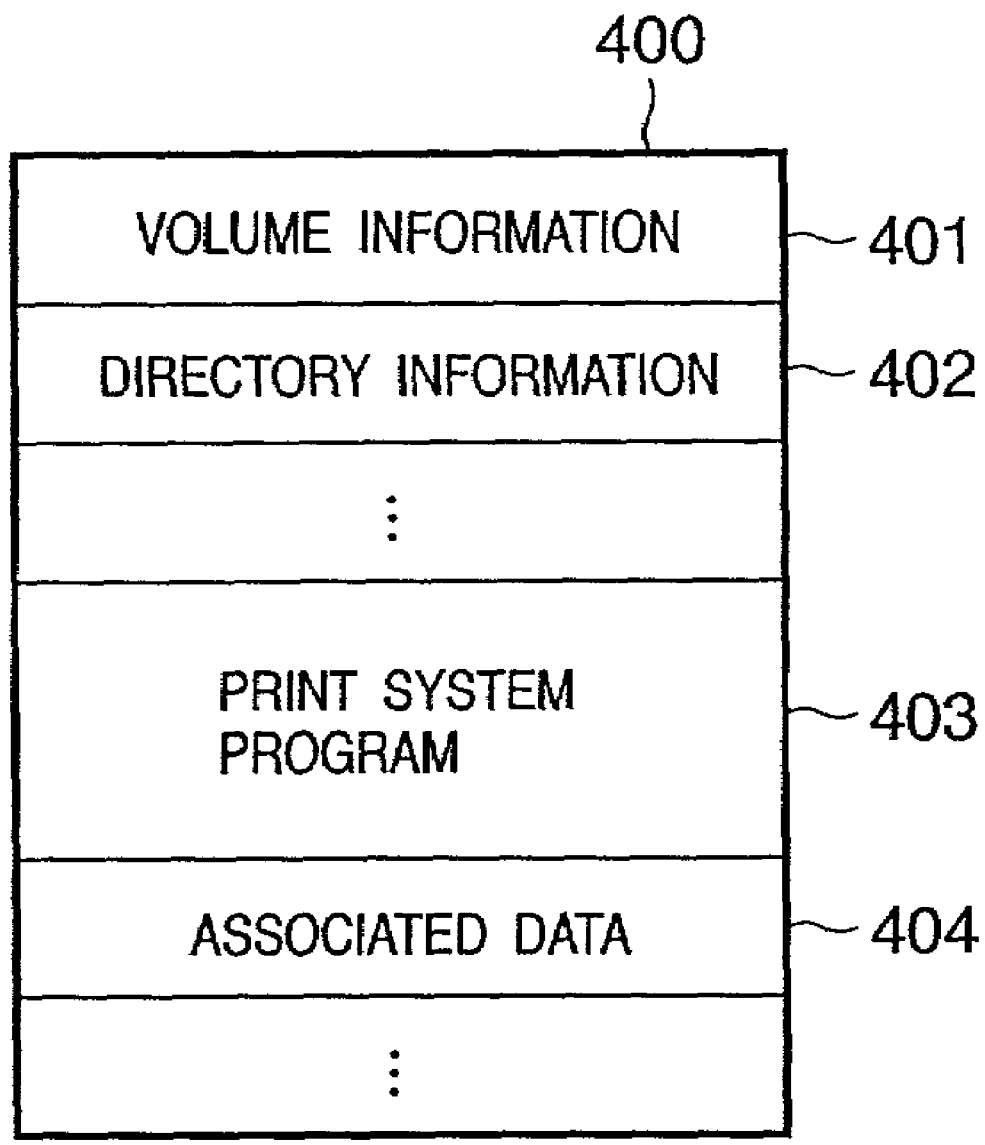
FIG. 4 is a view for explaining the data stored in the FD in the server and client computers according to the embodiment of the present invention.

The contents of the FD 204 can be stored in a storage means such as the HD 205. FIG. 4 shows the arrangement of the contents stored in the FD 204. Referring to FIG. 4, data contents 400 of the FD 204 include volume information 401 indicating the arrangement of data, directory information 402, a program 403 constituted by program codes based on the flow chart of a print system program to be described in this embodiment, and associated data 404.

The HD 205 stores the OS, print application program, print server program, print client program, and the like. The keyboard 206 is used by a user to input device control commands and the like to the print client PCs 103 and 104. The display 207 displays the command input from the keyboard 206, a print state, and the like. The system bus 208 controls the flow of data in the print client PCs 103 and 104.

In this embodiment, the print system program and associated data are directly loaded from the FD 204 into the RAM 202 and executed. However, this program and data may be loaded from the HD 205 into the RAM 202 every time the print system program is operated from the FD 204. In addition, this print system program may be stored in a CD-ROM, IC memory card, or the like other than the FD. Furthermore, the print system program may be recorded on the ROM 201 and set as part of a memory map to allow the CPU 200 to directly execute it.

Figure 5:
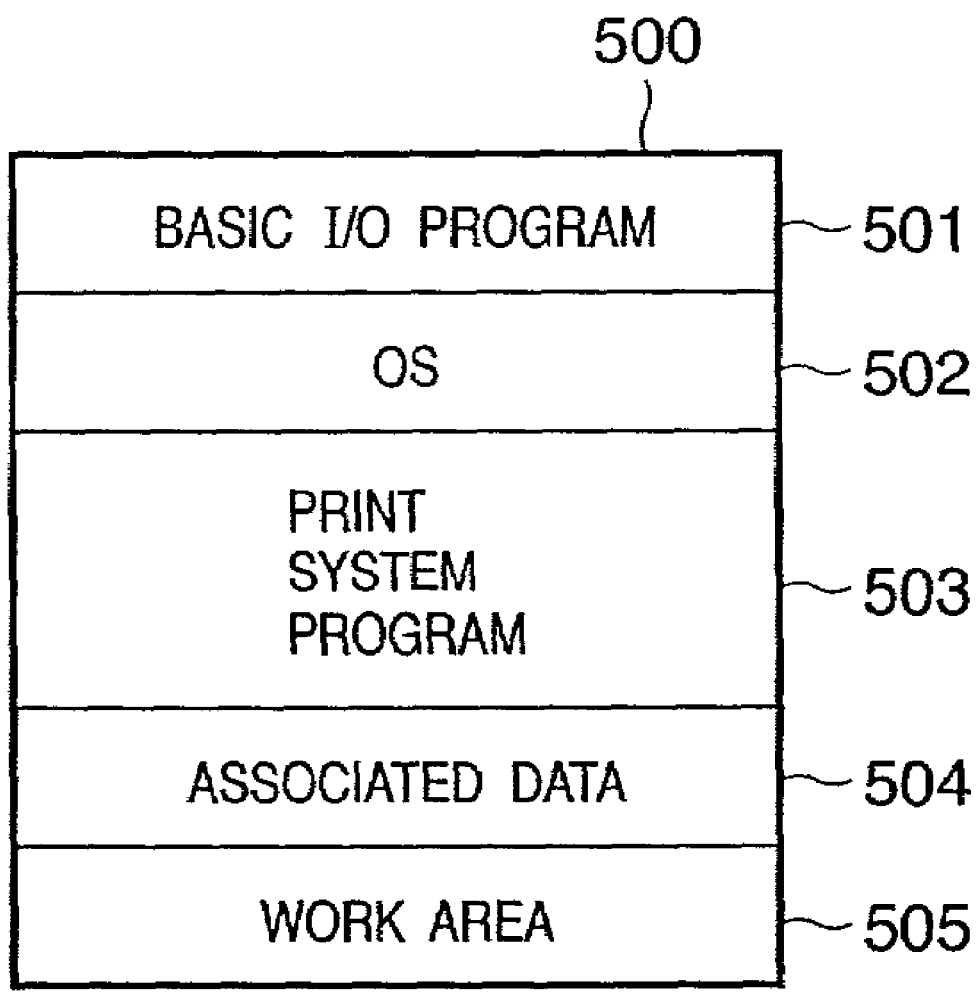
FIG. 5 is a view for explaining a memory map obtained when programs from an FD are mapped in the RAM of the server or client computer according to the embodiment of the present invention.

FIG. 5 shows a memory map in a state where the print system program according to this embodiment is loaded into the RAM 202 and ready to be executed. A basic I/O program 501, OS 502, print system program 503, and associated data 504 are mapped in a memory 500, and a work area 505 in which the CPU 200 executes the print system program is ensured. Note that the basic I/O program 501 is an area where a program having the IPL (Initial Program Loading) function of loading the OS from the HD 205 into the RAM 202 and starting the OS when the computer is powered on is stored.

Figure 6:
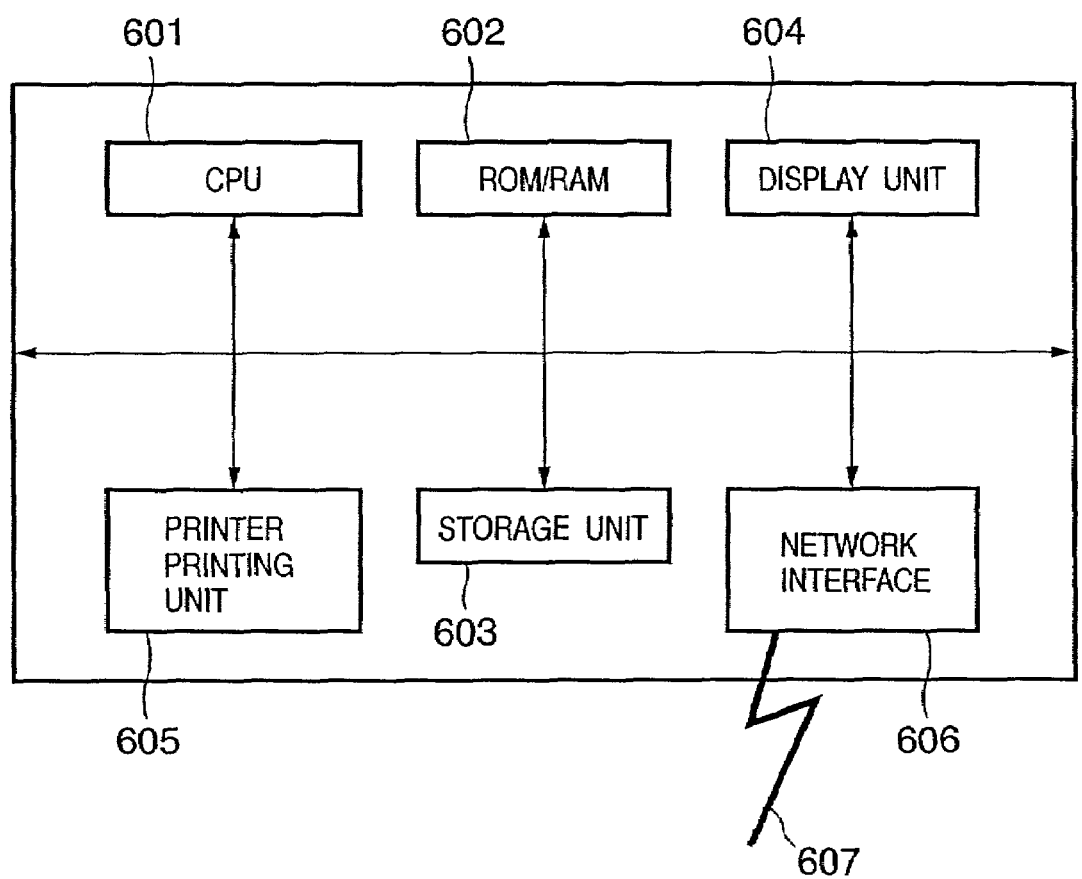
FIG. 6 is a block diagram showing the schematic arrangement of a printer according to the embodiment of the present invention.

FIG. 6 is a block diagram showing the schematic arrangement of the printer 105 according to the embodiment of the present invention. The printer 105 includes a CPU 601, ROM/RAM 602, storage unit 603, display unit 604, printer printing unit 605, network interface 606, and communication line 607.

The CPU 601 controls the overall apparatus. The ROM/RAM 602 includes a buffer for temporarily storing a control program for controlling the CPU 601, constant data, and transmission/reception data. The storage unit 603 is a storage means like, for example, a hard disk, and is used to store the data to be transmitted/received, the control program executed by the CPU 601, and data. The display unit 604 displays the data temporarily stored in the ROM/RAM 602, the contents of the data stored in the storage unit 603, an operation state, and the like. The printer printing unit 605 prints out dot data created by the CPU 601 on the basis of the program stored in the ROM/RAM 602. The network interface 606 communicates print data and the like with an external unit such as a print server PC through the network interface. The communication line 607 serves to connect the network interface 606 to the network 106.

Figure 7:
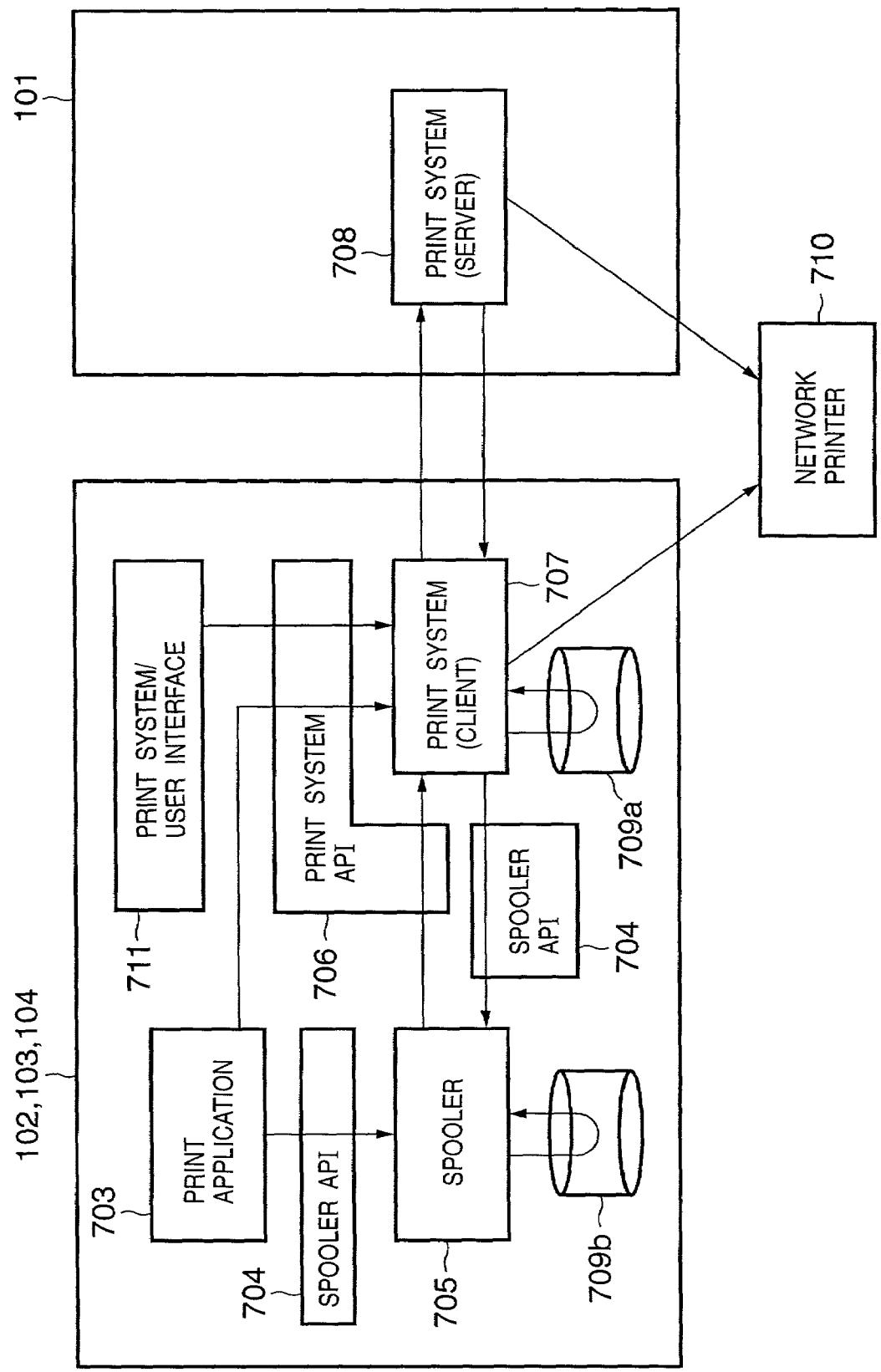
FIG. 7 is a view showing the software module configurations of the client PC and server according to the embodiment of the present invention.

FIG. 7 is a block diagram showing the software module configuration of the print client PCs 102 to 104 and print server PC 101. Reference numeral 703 denotes a print application; 705, a spooler provided by the OS; 704, a spooler API (Application Programming Interface) for providing an interface with the spooler; 711, a print system/user interface for allowing the user to see information such as the status of a job in the print system; 707, a client program for the print system; 706, a print system API for providing an interface with the print system; 708, a server program for the print system; 709a and 709b, HDs storing spool files; and, 710, a network printer.

Referring to FIG. 7, the print application 703 notifies the print system (client) 707 through the print system API 706 of an instruction to start grouping, and transfers print jobs to be grouped to the spooler 705 by using the spooler API 704 provided by the OS. Upon transferring all the print jobs, the print application 703 notifies the print system (client) 707 through the print system API 706 of an instruction to end grouping.

The spooler 705 is originally designed to temporarily spool print instructions in the HD 709b, schedules them, and sequentially transmit them to the printer. According to the arrangement of this embodiment, however, the spooler 705 transfers the print instructions to the print system (client) 707, instead of the printer, through a print system API 706.

The print system (client) 707 spools the print data received from the spooler 705 in the HD 709a and transmits the print data to the network printer 710 in accordance with job scheduling by the print system (server) 708. In this case, the print data may be transmitted through the print system (server) 708. If, for example, the print data are to be transmitted to the network printer 710 through the print system (server) 708, the print system (server) 708 transmits print jobs to the network printer 710 while managing the scheduling of the print jobs. If the print data are to be transmitted from the print system (client) 707 to the network printer 710, the print system (client) 707 transmits the print jobs to the network printer 710 in accordance with the schedule managed by the print system (server) 708.

In this case, the print system (client) 707 acquires the job information of the print jobs spooled in the spooler 705 through the spooler API 704. The print system (server) 708 acquires information about the state of the printer, a job having undergone printing, and the like from the network printer 710, and notifies the print system (client) 707 of the acquired information.

FIG. 8 shows job information to be created by the print system (client) upon reception of print data from the spooler 705. The job information includes the job ID issued by the print system (client) 707, the document name, status, and priority level acquired from the spooler 705, and the like.

Figure 9:
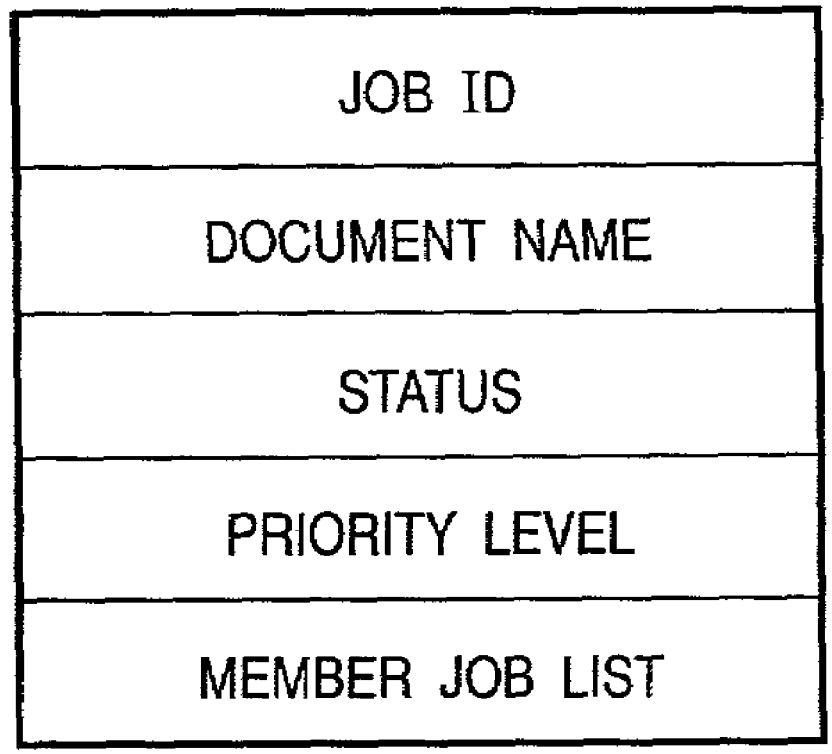
FIG. 9 is a view for explaining group job information according to the embodiment of the present invention.

FIG. 9 shows group job information to be used to make a plurality of grouped jobs (referred to as member jobs) look like one job (referred to as a group job). The group job information includes the job ID issued by the print system (client) 707 upon reception of a grouping start instruction from the print application 703, the document name, status, and priority level copied from the job information of the first member job in the group, and the job information list of the grouped member jobs. The member job list includes, for example, the job IDs of the respective member jobs and the like.

This print system refers to the job information list of each member job by referring to such a member job ID. More specifically, the job information list of each member job contains the status of each member job. The print system collectively analyzes (AND processing, OR processing, or the like) the statuses of the respective member jobs to implement the processing in FIGS. 11 to 15 (to be described later), thereby determining the status of a group job.

In addition, as described above, the status of each member job corresponds to the job information of a print job spooled in the spooler 705 which is acquired by the print system (client) 707 from the spooler 705 through the spooler API 704 or information indicating the state of the printer or information about a job having undergone printing which is acquired by the print system (server) 708 from the network printer 710 and sent to the print system (client) 707.

Figure 10:
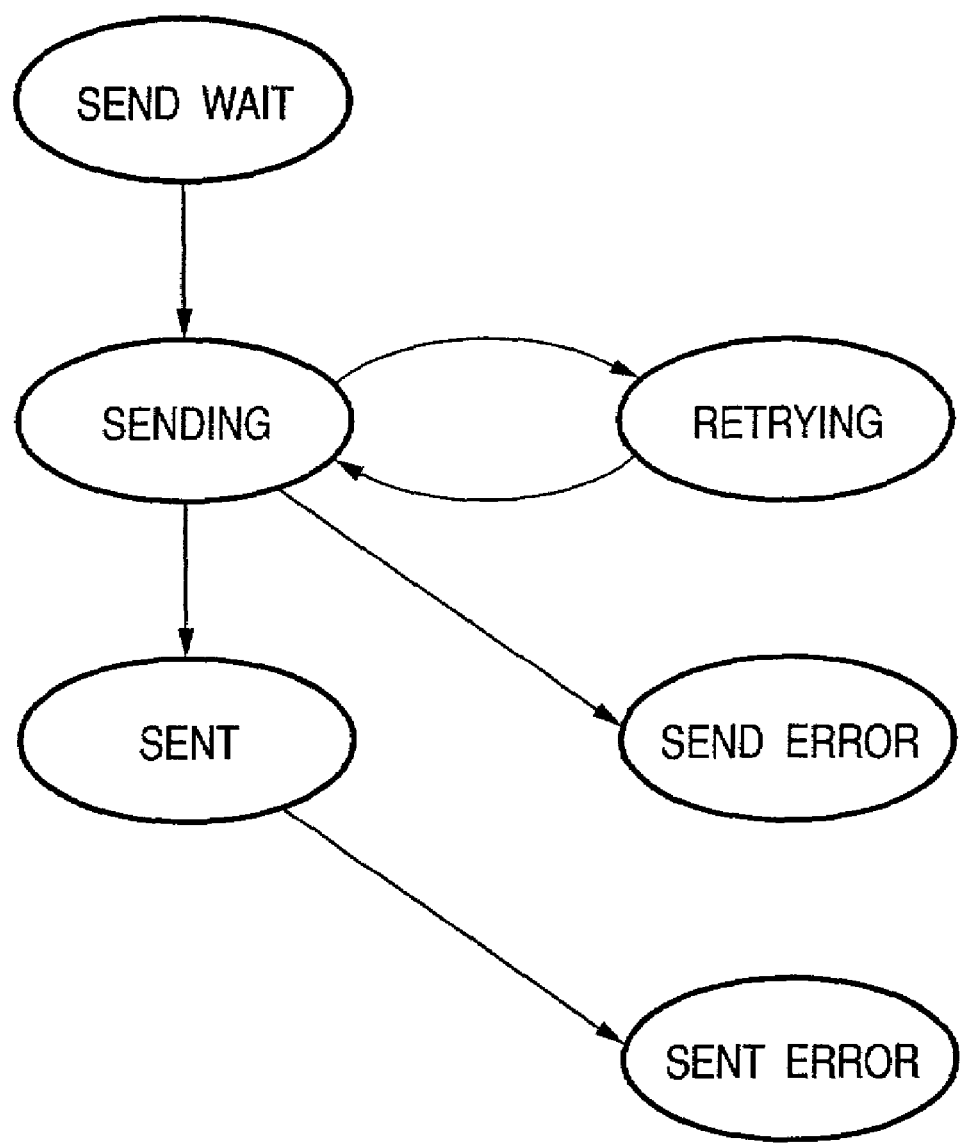
FIG. 10 is a status transition diagram showing the status transition of each print job according to the embodiment of the present invention.

FIG. 10 is a status transition diagram showing the status transition of a general print job that is not grouped. The status of the print job received from the spooler 705 changes to "send wait" in the print system (client) 707. When transmission is started in accordance with scheduling by the print system (server) 708, the status changes to "sending". When the transmission is complete, the status changes to "sent". Upon reception of a print completion notification from the print system (server) 708, the print system (client) 707 deletes the job with the status "sent".

If an error such as "paper out" that allows continuation of transmission occurs, and the transmission of print data is interrupted, the status of the print job changes to "retrying". In this case, when the network printer 710 is restored from the error state by, for example, replenishing the network printer 710 with paper, the status of the print job is also restored to "sending". Since a plurality of print data cannot be simultaneously transmitted to the network printer 710, only one print job has the status "sending" or "retrying" with respect to one network printer. This operation is controlled by scheduling by the print system (server) 708.

If an error that disables continuation of transmission occurs during transmission of print data, e.g., the power to the network printer 710 is disconnected, the transmission of the print data terminates with error, and the status of the print job changes to "send error".

If the print system (server) 708 notifies the print system (client) 707 that no print completion notification can be acquired from the network printer 710 due to, for example, disconnection of the power to the network printer 710, the status of the job changes from "sent" to "sent error". "Sent error" indicates that a print job has been transmitted, but a print completion has not been confirmed. That is, this state may be called a "print completion confirmation disabled state".

When the status of the print job changes from "sending" to "sent", "send error", or "sent error", the print system (server) 708 schedules other print jobs with the status "send wait" if the network printer 710 is ready to print.

The status of each member job of grouped print jobs changes in the same manner as a general job that is not grouped.

FIGS. 16 and 17 are views each showing an example of a window displayed by the print system/user interface 711. The user interface for displaying the status of each grouped job includes a job window (FIG. 16) for displaying grouped jobs as one job (group job) and a detailed window (FIG. 17) for displaying the status of each member job in the group. In the job window, general jobs that are not grouped and a group job are displayed together. When a group job is designated to open the detailed window, the status of each member job in the group is displayed.

The displayed windows in FIGS. 16 and 17 actually correspond to the windows that are based on window information for displaying the user interface contained in the print control program according to the present invention and displayed on the display unit through the OS, and are displayed on another display unit such as a CRT by the same mechanism.

Referring to FIG. 16, a group job "PowerPoint—presentation) is displayed as a group job in the job window. Referring to FIG. 16, only a group job is created, but the state of this print job is blank. This status column is updated by the procedure shown in the flow chart to be described later in accordance with the status of a group job. FIG. 17 shows a user interface window displaying the details of the group job. The left column indicates that this group job includes three member jobs, namely "PowerPoint—presentation", "test page", and "no title—memo". The right column displays the status of the selected job in more detail.

FIGS. 11 to 15 are flow charts showing the flow of processing to be performed when the print system (client) 707 changes the status of a member job and the status of a group job.

Figure 11:
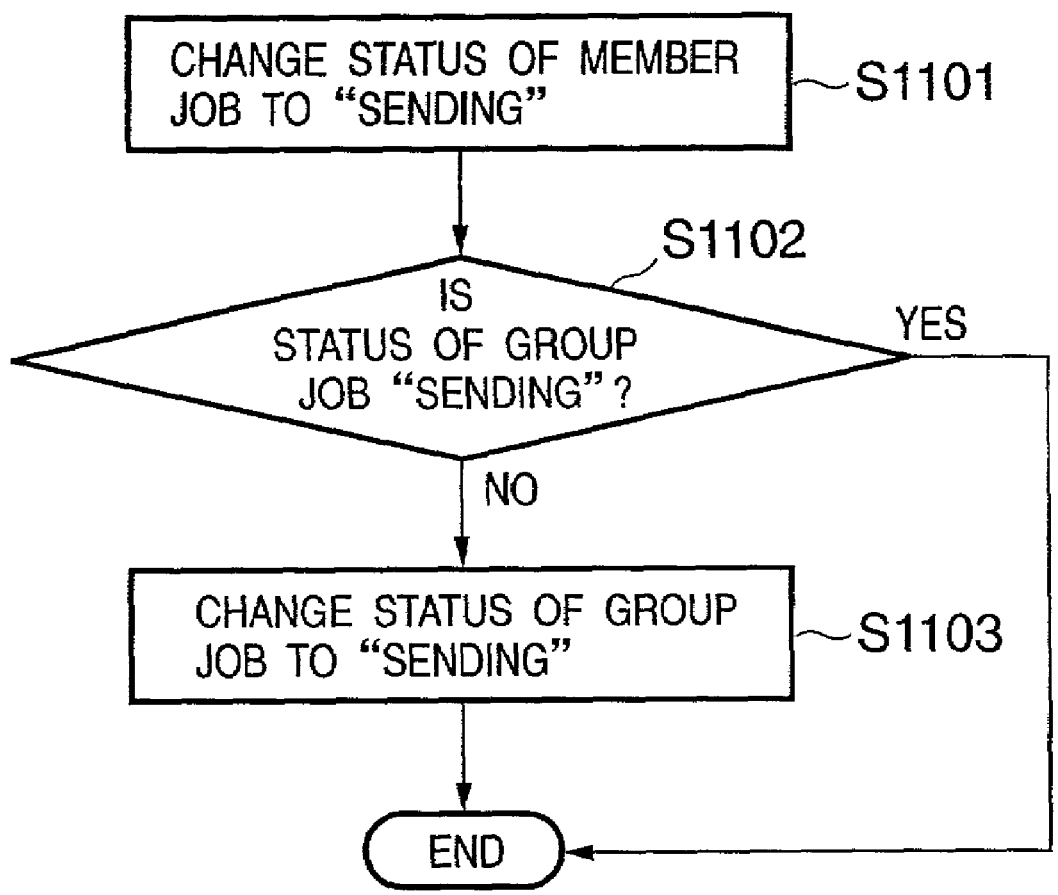
FIG. 11 is a flow chart showing the flow of processing to be performed when the print system according to the embodiment of the present invention changes the status of a member job into "sending"

FIG. 11 is a flow chart showing the flow of processing to be performed when the status of a member job is changed to "sending". When the transmission of a member job belonging to a group job is started, the status of the member job that is being transmitted is changed to "sending" in step S1101. In step S1102, it is checked whether the status of the group job to which the member job belongs is "sending". If the status of the group job is "sending", the processing is terminated. If the status is not "sending", the status of the group job is changed to "sending" in step S1103, and the processing is terminated.

Figure 12:
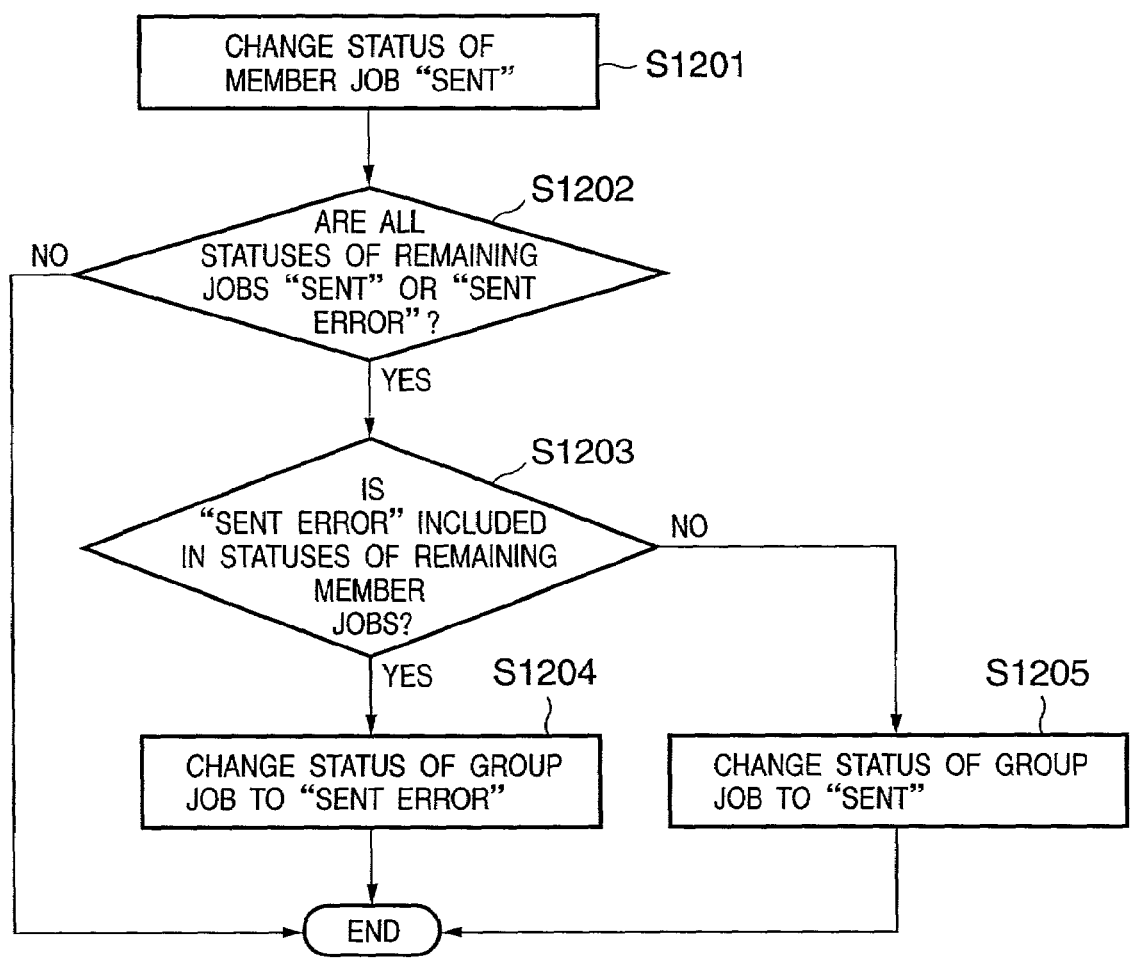
FIG. 12 is a flow chart showing the flow of processing to be performed when the print system according to the embodiment of the present invention changes the status of a member job into "sent"

FIG. 12 is a flow chart showing the flow of processing to be performed when the status of a member job is changed to "sent". When the transmission of a member job that has been transmitted is complete, the status of the member job is changed to "sent" in step S1201. It is checked in step S1202 whether the statuses of all the remaining member jobs in the group job to which the above member job belongs are "sent" or "sent error". If there is a member job whose status is neither "sent" nor "sent error", the processing is terminated. If the statuses of all the remaining member jobs are "sent" or "sent error", it is checked in step S1203 whether a member job with the status "sent error" is included in the group job. If a member job with the status "sent error" is included, the status of the group job is changed to "sent error" in step S1204, and the processing is terminated. If no member mob with the status "sent error" is included, the status of the group job is changed to "sent" in step S1205, and the processing is terminated.

Figure 13:
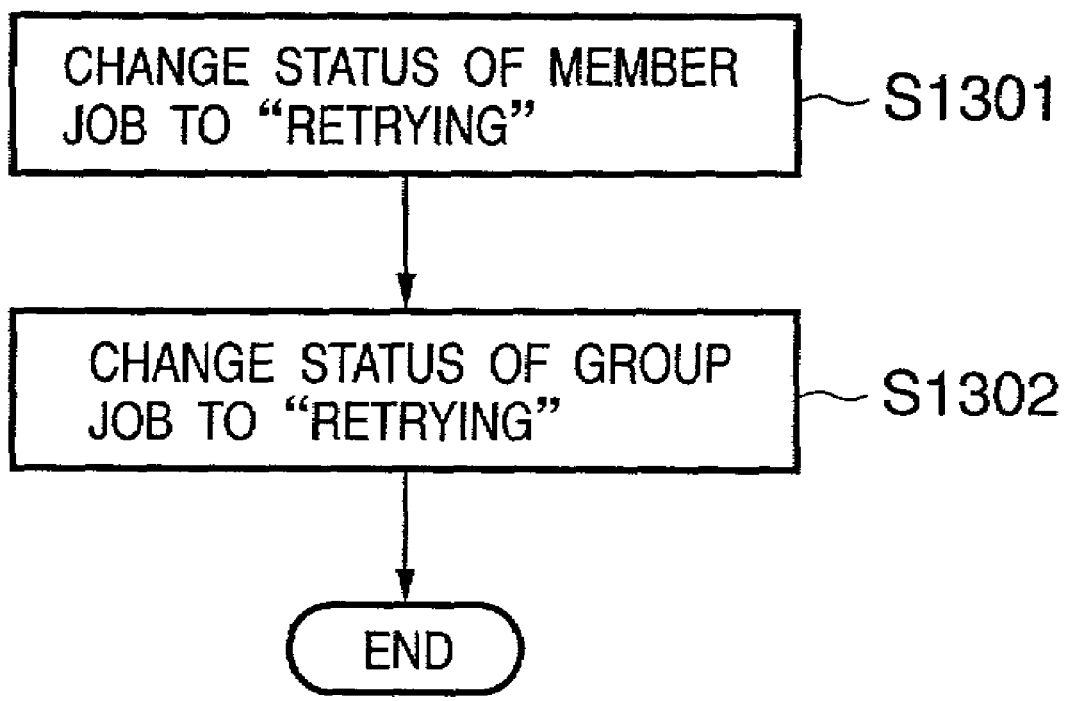
FIG. 13 is a flow chart showing the flow of processing to be performed when the print system according to the embodiment of the present invention changes the status of a member job into "retrying"

FIG. 13 is a flow chart showing the flow of processing to be performed when the status of a member job is changed to "retrying". When a transmission retry of a member job is started, the status of the member job is changed to "retrying" in step S1301, and the status of the group job to which the member job belongs is changed to "retrying" in step S1302.

Figure 14:
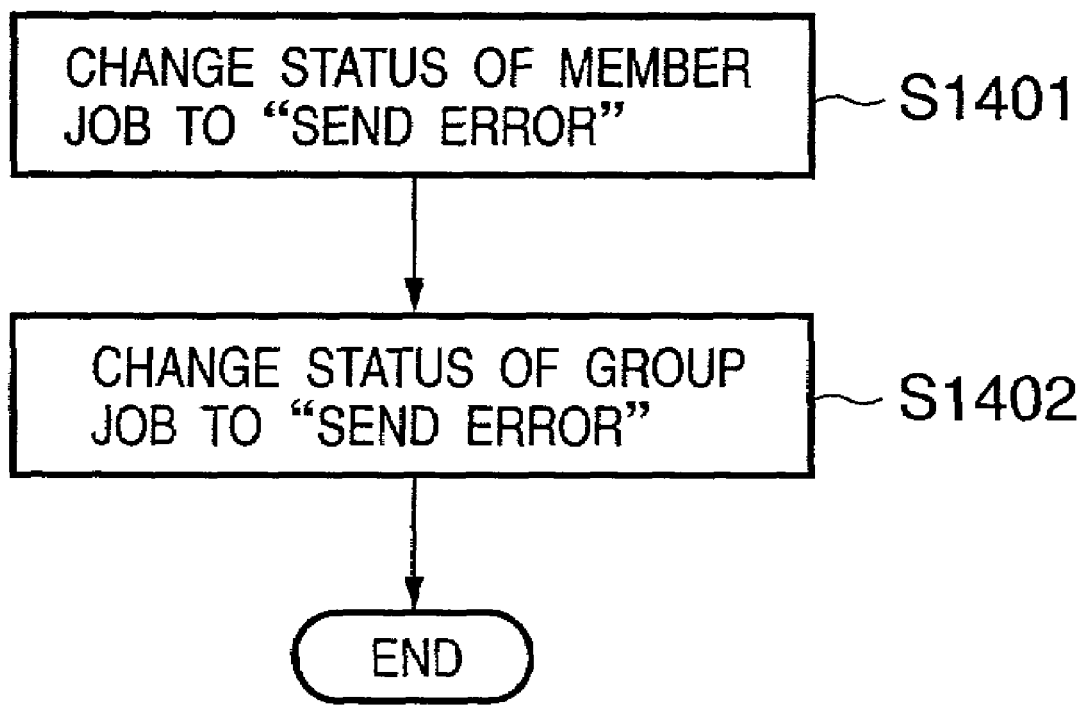
FIG. 14 is a flow chart showing the flow of processing to be performed when the print system according to the embodiment of the present invention changes the status of a member job into "send error"

FIG. 14 is a flow chart showing the flow of processing to be performed when the status of a member job is changed to "send error". In step S1401, the status of the member job is changed to "send error". In step S1402, the status of a group job to which the member job belongs is changed to "send error". The print system (server) 708 changes the status of the group job to "send error". Even if the remaining member jobs belonging to the group job includes a job with the status "send wait", the member job is omitted from scheduling.

In other words, by performing the processing shown in FIG. 14, when the status of any one of the member jobs constituting a group job changes to "stop", processing of the remaining member jobs is stopped regardless of their statuses. This makes it possible to prevent wasteful transmission retry processing and the like.

Figure 15:
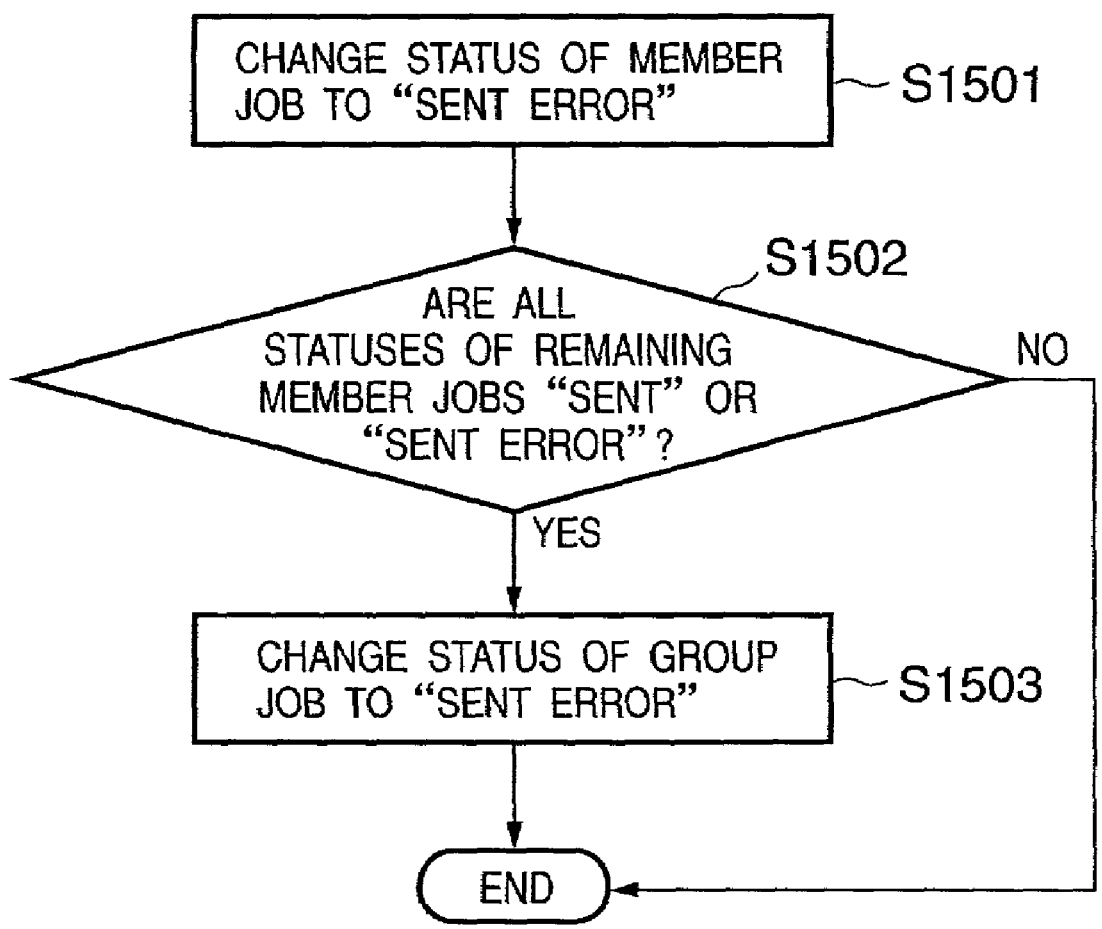
FIG. 15 is a flow chart showing the flow of processing to be performed when the print system (client) according to the embodiment of the present invention changes the status of a member job into "sent error"

FIG. 15 is a flow chart showing the flow of processing to be performed when the status of a member job is changed to "sent error". If an error occurs after the transmission of a member job, the status of the member job is changed to "sent error" in step S1501. In step S1502, it is checked whether the statuses of all the remaining member jobs belonging to the group job to which the above member job belongs are "sent" or "sent error". If there is a member job with a status other than "sent" or "sent error", the processing is terminated. If the status of this member job is "sent" or "sent error", the status of the group job is changed to "sent error" in step S1503, and the processing is terminated.

As described above, with the processing in FIGS. 11 to 15, when the transmission of a member job in a group terminates with the status "send error", the remaining member jobs in the group are omitted from scheduling even if their statuses are "send wait", thereby making the status of the group job undergo a status transition similar to that (shown in FIG. 10) of general jobs that are not grouped. With this operation, even the status of a group job formed by grouping a plurality of member jobs can be displayed as if it were a single job. The user can therefore handle the group job as one job.

The above processing mechanisms unique to the present invention can be applied to various print apparatuses/print control apparatuses including monochrome/color laser beam printers, ink-jet printers, thermal printers, digital composite apparatuses such as an apparatus having a copy function, a FAX function, and a function of printing print data transmitted from an external device through a network, and print control apparatuses for controlling print apparatuses.

As has been described above, according to the present invention, even if a plurality of grouped jobs are made to look like one job to the user, the status transition of the group job can be made without causing the user to notice the difference between the group job and a general job.

In addition, according to the present invention, when the status of a member job changes to "sending", the status of the group job to which the member job belongs is changed to "sending", thus providing a status transition of the group job.

According to the present invention, when the status of a member job changes to "sent", if the statuses of all the member jobs belonging to the group job to which the above member job belongs are "sent", the status of the group job is changed to "sent". If the statuses of all the member jobs include "sent error" indicating the occurrence of an error after transmission to the printer as well as the status "sent", the status of the group job is changed to "sent error", thereby providing a status transition of the group job.

According to the present invention, when the status of a member job changes to "interrupt", the status of the group job to which the member job belongs is changed to "interrupt", thereby providing a status transition of the group job.

According to the present invention, when the status of a member job changes to "stop", the status of the group job to which the member job belongs is changed to "stop", thereby providing a status transition of the group job.

According to the present invention, when the status of a member job changes to "sent error", if the statuses of all the member jobs belonging to the group jot to which the above member job belongs are "sent" or "sent error", the status of the group job is changed to "sent error", thereby providing a status transition of the group job.

In addition, according to the present invention, the statuses of print jobs under processing, including the status of above group job, can be displayed.

Furthermore, according to the present invention, when the status of one of the above member jobs changes to "stop", the processing of other member jobs is stopped regardless of their statuses. This makes it possible to prevent wasteful processing in accordance with the status of a group job.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus that communicates with a printing apparatus that consecutively outputs a plurality of member print jobs included in a group print job in a designated order, said plurality of member print jobs being grouped in the group print job, comprising:
   an output unit constructed to output the group print job including the member print jobs to the printing apparatus; and
   a controller that causes a display unit to display a status of the group print job and a status of a non-grouped print job together in a window, and when a status of a member print job included in the group print job changes, the controller causes the display unit to display the changed status of the group print job to which the member print job belongs,
   wherein said controller further causes the display unit to display information of the member print job included in the group print job when the group print job displayed in the window is designated via a user interface.

2. The apparatus according to claim 1, wherein the status of the member print jobs includes an error status of processing in the printing apparatus, and
   said controller causes the display unit to display the status of the group print job that has changed in accordance with an error in a member print job.

3. The apparatus according to claim 1 wherein said controller causes the display unit to display a transmission-in-progress state as the status of the group print job in accordance with a change in the status of one of the member print jobs that has changed to a transmission-in-progress state.

4. The apparatus according to claim 1, wherein said controller causes the display unit to display a suspension state as the status of the group print job, to which the member print job belongs, in accordance with a change in the status of one of the member print jobs that has changed to a suspension state indicative of data transmission suspension that can start data transmission again after the printing apparatus recovers from an error.

5. The apparatus according to claim 1, wherein said controller causes termination of processing on other member print jobs when the status of one of the member print jobs is changed to a termination state, indicative of data transmission termination that cannot start data transmission again.

6. The apparatus according to claim 1, wherein said controller causes the display unit to display a data transmission completion state as the status of the group print job in accordance with a change in the status of one of the member print jobs that has changed to a data transmission completion state indicative of completion of data transmission to the printing apparatus, and causes the display unit to display an error state as the status of the group print job in accordance with a change in the status of one of the member print jobs that has changed to an error state indicative of an error in data transmission to the printing apparatus.

7. A method of an information processing apparatus communicating with a printing apparatus that consecutively outputs a plurality of member print jobs included in a group print job in a designated order, said plurality of member print jobs being grouped in the group print job, said method comprising:
   an output step of outputting the group print job including member print jobs to the printing apparatus; and
   a control step of causing a display unit to display a status of the group print job and a status of a non-grouped print job together in a window, and when a status of a member print job included in the group print job changes, causes the display unit to display the changed status of the group print job to which the member print job belongs,
   wherein said controller further causes the display unit to display information of the member print job included in the group print job when the group print job displayed in the window is designated via a user interface.

8. The method according to claim 7, wherein the status of the member print jobs includes an error status of processing in the printing apparatus, and
   said control step causes the display unit to display the status of the group print job that has changed in accordance with an error in a member print job.

9. The method according to claim 7, wherein said control step causes the display unit to display a transmission-in-progress state as the status of the group print job in accordance with a change in the status of one of the member print jobs that has changed to a transmission-in-progress state.

10. The method according to claim 7, wherein said control step causes the display unit to display a suspension state as the status of the group print job, to which the member print job belongs, in accordance with a change in the status of one of the member print jobs that has changed to a suspension state indicative of data transmission suspension that can start data transmission again after the printing apparatus recovers from an error.

11. The method according to claim 7, further comprising a termination control step of causing termination of processing on other member print jobs when a status of one of the member print jobs is changed to a termination state, indicative of data transmission termination that cannot start data transmission again.

12. The method according to claim 7, wherein said control step causes the display unit to display a data transmission completion state as the status of the group print job in accordance with a change in the status of one of the member print jobs that has changed to a data transmission completion state indicative of completion of data transmission to the printing apparatus, and causes the display unit to display an error state as the status of the group print job in accordance with a change in the status of one of the member print jobs that has changed to an error state indicative of an error in data transmission to the printing apparatus.

13. A computer-readable medium on which is stored a computer program for causing a computer to communicate with a printing apparatus that consecutively outputs a plurality of member print jobs included in a group print job in a designated order, said plurality of member print jobs being grouped in the group print job, said program comprising:

an output step of outputting the group print job including member print jobs to the printing apparatus; and a control step of causing a display unit to display a status of the group print job and a status of a non-grouped print job together in a window, and when a status of a member print job included in the group print job changes, causes the display unit to display the changed status of the group print job to which the member print job belongs, wherein said controller further causes the display unit to display information of the member print job included in the group print job when the group print job displayed in the window is designated via a user interface.

14. The computer-readable medium according to claim 13, wherein the status of the member print jobs includes an error status of processing in the printing apparatus, and said control step causes the display unit to display the status of the group print job that has changed in accordance with an error in a member print job.

15. The computer-readable medium according to claim 13, wherein said control step causes the display unit to display a transmission-in-progress state as the status of the group print job in accordance with a change in the status of one of the member print jobs that has changed to a transmission-in-progress state.

16. The computer-readable medium according to claim 13, wherein said control step causes the display unit to display a suspension state as the status of the group print job, to which the member print job belongs, in accordance with a change in the status of one of the member print jobs that has changed to a suspension state indicative of data transmission suspension that can start data transmission again after the printing apparatus recovers from an error.

17. The computer-readable medium according to claim 13, further comprising a termination control step of causing termination of processing on other member print jobs when the status of one of the member print jobs is changed to a termination state, indicative of data transmission termination that cannot start data transmission again.

18. The computer-readable medium according to claim 13, wherein said control step causes the display unit to display a data transmission completion state as the status of the group print job in accordance with a change in the status of one of the member print jobs that has changed to a data transmission completion state indicative of completion of data transmission to the printing apparatus, and causes the display unit to display an error state as the status of the group print job in accordance with a change in the status of one of the member print jobs that has changed to an error state indicative of an error in data transmission to the printing apparatus.

* * * * *

UNITED STATES PATENT AND TRADEMARK OFFICE
CERTIFICATE OF CORRECTION

PATENT NO. : 7,315,404 B2
APPLICATION NO. : 09/969819
DATED : January 1, 2008
INVENTOR(S) : Kimura It is certified that error appears in the above-identified patent and that said Letters Patent is hereby corrected as shown below:

The title page showing the illustrative figure should be deleted to be replaced with the attached title page.

The drawing sheet, consisting of Fig. 17, should be deleted to be replaced with the drawing sheet, consisting of Fig. 17, as shown on the attached page.

COLUMN 1:
  Line 32, "job" should read -- jobs --.

COLUMN 7:
  Line 13, "tation)" should read -- tation" --;
  Line 46, "error", the" should read -- error", the --;
  Line 47, "are "sent" should read -- are "sent" --;
  Line 48, "or "sent error",it" should read -- or "sent error", it --;
  Line 52, "member mob" should read -- member job --; and
  Line 54, "to"sent" should read -- to "sent" --.

COLUMN 8:
  Line 2, "includes" should read -- include --.

COLUMN 9:
  Line 3, "group jot" should read -- group job --; and
  Line 46, "claim 1" should read -- claim 1, --.

Signed and Sealed this

Twenty-eighth Day of April, 2009

JOHN DOLL
*Acting Director of the United States Patent and Trademark Office*

(12) United States Patent
Kimura

(10) Patent No.: US 7,315,404 B2
(45) Date of Patent: Jan. 1, 2008

(54) MONITORING JOB STATUS FOR GROUPED PRINT JOBS

(75) Inventor: Mitsuo Kimura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 665 days.

(21) Appl. No.: 09/969,819

(22) Filed: Oct. 4, 2001

(65) Prior Publication Data

US 2002/0042797 A1    Apr. 11, 2002

(30) Foreign Application Priority Data

Oct. 6, 2000    (JP)    ............................ 2000-307892
Sep. 27, 2001   (JP)    ............................ 2001-297448

(51) Int. Cl.
*H04N 1/32*     (2006.01)
*H04N 1/333*    (2006.01)
*G06F 3/14*     (2006.01)
*G06F 11/32*    (2006.01)
*G06F 3/12*     (2006.01)

(52) U.S. Cl. .............. 358/406; 358/1.15; 358/441; 358/1.13

(58) Field of Classification Search ............ 358/1.15, 358/1.2, 1.16, 1.9, 1.3, 1.14
See application file for complete search history.

(56) References Cited

U.S. PATENT DOCUMENTS

| | | | | |
|---|---|---|---|---|
| 5,799,206 | A * | 8/1998 | Kitagawa et al. | 710/36 |
| 5,937,151 | A * | 8/1999 | Kadota | 358/1.15 |
| 6,173,289 | B1 * | 1/2001 | Sonderegger et al. | 707/103 R |
| 6,213,652 | B1 * | 4/2001 | Suzuki et al. | 358/1.15 |
| 6,396,594 | B1 * | 5/2002 | French et al. | 358/1.18 |
| 6,474,881 | B1 * | 11/2002 | Wanda | 400/61 |
| 6,549,947 | B1 * | 4/2003 | Suzuki | 709/229 |
| 6,559,965 | B1 * | 5/2003 | Simpson et al. | 358/1.15 |
| 6,583,886 | B1 * | 6/2003 | Ochiai | 358/1.15 |
| 6,734,985 | B1 * | 5/2004 | Ochiai | 358/1.15 |
| 6,809,831 | B1 * | 10/2004 | Minari | 358/1.15 |
| 6,980,305 | B2 * | 12/2005 | Martinez | 358/1.1 |

(Continued)

FOREIGN PATENT DOCUMENTS

JP        11-119940        4/1999

(Continued)

OTHER PUBLICATIONS

U.S. Appl. No. 09/354,727, filed Jul. 16, 1999.

(Continued)

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

When a group print job is to be processed, a print application issues a grouping start instruction to a print system client first. The respective print jobs are then transmitted to a spooler. The print system client extracts the print jobs and sends them to a printer in accordance with scheduling by a print system server. In this case, if a transmission retry, transmission error, error after transmission, or the like occurs in a member print job belonging to the group job, the corresponding status is set as the status of the group job. The subsequent processing is performed as if the error had occurred in the overall group job.

18 Claims, 17 Drawing Sheets

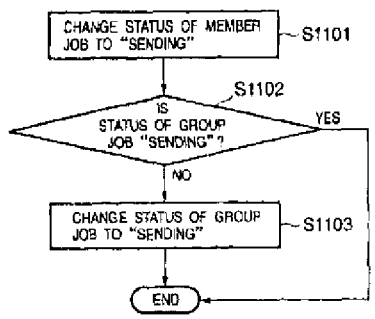

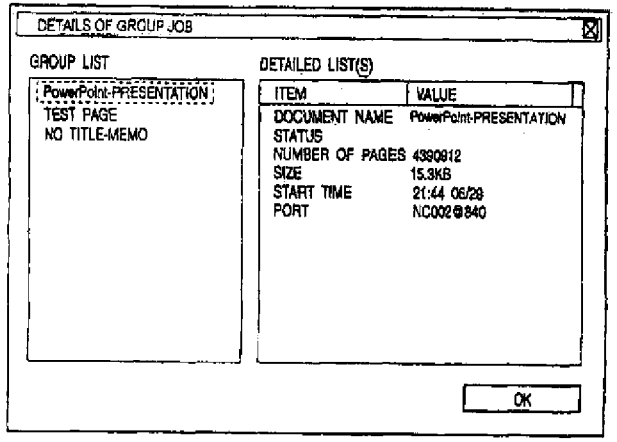

FIG. 17

DETAILS OF GROUP JOB

GROUP LIST
- PowerPoint-PRESENTATION
- TEST PAGE
- NO TITLE-MEMO

DETAILED LIST(S)

| ITEM | VALUE |
|---|---|
| DOCUMENT NAME | PowerPoint-PRESENTATION |
| STATUS | |
| NUMBER OF PAGES | 4390912 |
| SIZE | 15.3KB |
| START TIME | 21:44 06/29 |
| PORT | NC002@840 |

OK